United States Patent Office

2,719,113
Patented Sept. 27, 1955

2,719,113

HYDROCARBON CONVERSION WITH MOLTEN SALT CATALYSTS

Armand J. de Rosset, Clarendon Hills, Ill., assignor to Universal Oil Products Company, Chicago, Ill., a corporation of Delaware No Drawing. Application September 5, 1952, Serial No. 308,165

8 Claims. (Cl. 196—52)

This invention relates to an improved method for treating or converting hydrocarbon substances by subjecting them to contact with a molten salt catalyst.

It has long been known that hydrocarbons can be cracked either non-catalytically or by contact with catalytic substances under cracking conditions. Catalytic cracking is preferred because the use of a catalyst in a cracking process causes the reaction to be more selective, that is, to produce a greater quantity of desirable reaction products and a lesser quantity of coke and gaseous products.

The catalytic processes generally in use comprise contacting the hydrocarbon to be cracked with a solid, granular catalyst, at cracking conditions, where the catalyst is either in a fixed bed or in a moving or fluidized bed. The conversion reactions are characterized by the formation of a carbonaceous material called coke, which deposits on the catalyst, covering the active catalytic surfaces and rendering the catalyst inactive. The catalyst cannot be used to promote further reactions until it is regenerated by removing the coke formation by burning it therefrom. Regeneration is accomplished either by interrupting the hydrocarbon feed to the catalyst bed and subsequently contacting the catalyst with oxygen-containing gas in the case of fixed bed operations, or by causing the catalyst to continuously flow in a cycle between a reaction zone where it is contacted with hydrocarbon and a regeneration zone where it is contacted with oxygen-containing gas.

Catalytic conversion processes using solid, granular catalyst have many inherent undesirable characteristics. Regeneration of catalyst is a costly operation in that it requires a great deal of additional equipment and an additional reactant namely, the regenerating gas. The catalyst activity steadily declines due to high regeneration temperatures and exposure to stripping steam, necessitating periodic removal, discarding, and replacing with fresh catalyst. The difficulty of separating catalyst from reaction products causes catalyst to be lost and flow of hard, solid particles causes erosion of equipment and costly maintenance of mechanical devices.

The present invention provides a catalyst of greater selectivity that may be used in a manner which eliminates the above mentioned operational difficulties in a continuous, non-regenerative process of cracking hydrocarbonaceous substances.

It is an object of this invention to use as a catalyst for cracking hydrocarbon substances a sulfide of a group V–A element in the molten state. A further object of this invention is to use mixtures of the above mentioned molten sulfides as catalysts.

Liquid catalyst is superior to solid catalyst for many reasons. The catalyst of this invention needs no regeneration as there are no sharply defined surfaces for carbonaceous material to accumulate on. The tendency for solid catalyst to form coke on its surfaces is due largely to its adsorptive nature, which holds hydrocarbon molecules to its surface and progressively cracks off hydrogen and polymerizes the molecules to an increasingly heavier and more carbonaceous substance. Liquid catalysts have very little adsorptive tendencies and thus form a minimum of coke; furthermore the coke that does form is a separate solid phase that can be separated from the catalyst by washing, filtering or some other convenient means, leaving the catalyst in its original state of activity. The liquid catalyst can be stirred, pumped and otherwise handled in the same manner and with the same equipment as any liquid, thereby creating no problem of erosion or no need for special equipment. Any degree of contact between the charging stock and the catalyst may be obtained by commingling with mechanical stirrers or streams of inert gas or reactant-containing gases such as hydrogen.

A liquid catalyst allows the entire cracking process to be accomplished in one vessel that can be made to operate at any pressure, thereby eliminating the excessive instrumentation needed to balance pressures between various zones. The vessel can be of moderate size since heat transfer to and from the reaction zone can be easily accomplished through the liquid catalyst with conventional heat exchangers. The liquid catalyst can accommodate any form of charge stock including gaseous hydrocarbons, gasoline, light oils, heavy oils, tars, asphaltic residues, coal pastes, oil shales, etc.

For cracking, the process will generally be carried out at a temperature of from about 500° F. to about 2000° F. and at a pressure of from atmospheric to about 1500 pounds per square inch, or more, depending upon the nature of the charge stock and the degree of conversion desired. The preferred operation will be at a temperature of from about 500° F. to about 1300° F. and a pressure of from about 5 pounds per square inch to about 300 pounds per square inch.

Any suitable apparatus may be used to effect the conversions hereinabove described. The charge stock may be introduced into a reaction zone containing hot catalyst or the charge stock and catalyst may be circulated through a reaction zone concurrently. The reaction zone may be provided with a regeneration vessel for contacting the catalyst with oxygen-containing gas or be provided with other means of coke removal such as filters, precipitators etc. The charge stock may be dispersed in the catalyst by the concurrent addition of a gas which may or may not be a reactant. The reactor inlet may be provided with a distributing device to effect the mixing of charge stock and catalyst.

Heat for the conversion reactions may be supplied through any conventional heater disposed either in the reaction zone or externally. Heat may be supplied either to the charge stock or to the catalyst, however, it is preferred to supply the necessary heat to the catalyst to avoid coking in oil heater tubes. When the reaction to be effected is exothermic, cooling may be provided by methods similar to those described for supplying heat.

The catalysts of the present invention have the properties of being immiscible with the hydrocarbon charging stock and, for any particular conversion process to be catalyzed, the salt must be a liquid at the operating temperature of the process. Table I below shows the melting point of several salts that may be used as catalysts:

TABLE I

| Salt: | Melting point, °F. |
|---|---|
| $P_4S_3$ | 342 |
| $P_3S_6$ | 568 |
| $P_4S_6$ | 554 |
| $P_2S_5$ | 527 |
| $As_2S_2$ | 584 |
| $As_2S_3$ | 572 |
| $Sb_2S_3$ | 1022 |
| $Sb_2S_5$ | 275 |
| $Bi_2S_3$ | 1265 |

Certain mixtures of the above salts have melting points that are lower than either pure salt and thus mixtures may be used either to form a suitable catalyst for a lower temperature conversion or to form a higher activity catalyst, in that synergistic effects have been noted for several mixtures of salts.

The catalysts of this invention are especially useful for promoting cracking reactions but their use is not limited to this process. By varying reaction conditions and feed composition other conversions may be effected including 1) treatment of gasoline to improve its antiknock properties in processes known as reforming, isoforming, retreating, etc., 2) alkyl transfer, as for example, the reaction of xylene and benzene to form toluene, etc., 3) alkylation of aromatic or paraffinic hydrocarbons with olefinic hydrocarbons, alcohols, esters, etc., 4) polymerization of unsaturated hydrocarbons to form higher boiling hydrocarbons, 5) treating petroleum fractions to remove undesirable contaminants as, for example, the desulfurization of gasoline, and others.

Following are several examples to illustrate the effect of various catalysts of this invention. Example I illustrates the thermal effects at standard operating conditions and further gives a basis for comparison by establishing the degree of conversion with no catalyst present. Example II illustrates the use of a phosphorus sulfide as a cracking catalyst. Example III illustrates an arsenic sulfide, and Example IV an antimony sulfide. All the examples are from runs which used identical operating conditions as set forth below in Table II.

TABLE II

Operating conditions

| | |
|---|---|
| Duration, hours | 2 |
| Temperature, °F | 750 |
| $H_2$ pressure, atm | 35 |

In all the examples the same charge stock was used which was a Mid-Continent light cycle oil having the characteristics listed in Table III below:

TABLE III

| | |
|---|---|
| Specific gravity, °API | 31.0 |
| Distillation: | |
| Over at 400° F., volume per cent | 4.0 |
| 650° F. and over+bottoms, vol. per cent | 4.1 |

All runs were made in a glass lined bomb and were run with continuous agitation.

Example I

Example I is for the purpose of establishing the thermal effects on the charge stock at the operating conditions of the examples. Example I illustrates the use of the bomb apparatus described above under the standard operating conditions of the examples with no catalyst present in the reaction chamber. The results of this run are set forth in Table IV below.

TABLE IV

| | |
|---|---|
| Specific gravity, °API | 31.9 |
| Distillation: | |
| Over at 400°, volume per cent | 9.2 |
| 650+bottoms, volume per cent | 4.7 |
| Per cent conversion | 9.4 |

It can be seen from this example that the thermal effects at the standard operating conditions are very small.

Example II

The catalyst of Example II is phosphorus pentasulfide which was used in a ratio of one part of catalyst to one hundred parts of charge stock. The data from this run are set forth in Table V below.

TABLE V

| | |
|---|---|
| Specific gravity, °API | 33.9 |
| Distillation: | |
| Over at 400°, volume percent | 33.5 |
| 650 + bottoms, volume percent | 10.0 |
| Percent conversion | 52.5 |

Example II illustrates the great increase in the degree of conversion effected by the catalyst when used at the same operating conditions as in Example I.

Example III

The catalyst of Example III is $As_2S_3$ which was used in a ratio of one part of catalyst to one hundred parts of charge stock. The results of this run are set forth in Table VI below.

TABLE VI

| | |
|---|---|
| Specific gravity, °API | 34.3 |
| Distillation: | |
| Over at 400°, volume percent | 49.1 |
| 650 + bottoms, volume percent | 11.8 |
| Percent conversion | 45.6 |

Example IV

The catalyst of this example is $Sb_2S_5$ which was used in a ratio of one part catalyst to one hundred parts of charge stock. The results of this run are set forth in Table VII below.

TABLE VII

| | |
|---|---|
| Specific gravity, °API | 33.8 |
| Distillation: | |
| Over at 400°, volume percent | 35.3 |
| 650 + bottoms, volume percent | 6.9 |
| Percent conversion | 35.2 |

In all cases, when the contents of the bomb used for the run were discharged, there was no evidence of coke formation except in some cases a slight cloudiness was evident on the glass liner of the bomb. It might be noted that the conversions of Examples II, III, and IV are exceptionally high considering that the charge stock was a refractory cycle oil, and a greater degree of conversion may be expected when the charge stock comprises a straight run gas oil. Furthermore, better selectivity will be obtained when the process is effected on a continuous basis, in that the products in the gasoline fraction will vaporize and escape from contact with the catalyst before they are cracked further to lighter products.

I claim as my invention:

1. A process for the conversion of hydrocarbon oil heavier than gasoline which comprises contacting the oil at cracking conditions with a molten sulfide of an element selected from the group consisting of phosphorus, arsenic, antimony and bismuth.

2. The process of converting hydrocarbonaceous substances which comprises contacting said hydrocarbonaceous substances with a molten catalyst which comprises at least one sulfide of the normally solid elements of group V–A of the periodic table at a temperature of from about 500° F. to about 2000° F. and a pressure of from about atmospheric to about 1500 pounds per square inch.

3. The process of claim 2 further characterized in that said sulfide is a sulfide of phosphorus.

4. The process of claim 2 further characterized in that said sulfide is a sulfide of arsenic.

5. The process of claim 2 further characterized in that said sulfide is a sulfide of antimony.

6. The process of claim 2 further characterized in that said sulfide is a sulfide of bismuth.

7. The process of claim 2 further characterized in that said molten catalyst is a mixture of at least two sulfides of the normally solid elements of group V–A of the periodic table.

8. The process of cracking a hydrocarbon boiling above the gasoline range to form gasoline which comprises contacting said hydrocarbon with molten phosphorus pentasulfide at a temperature of from about 500° F. to about 1300° F. and a pressure of from about 5 pounds per square inch to about 300 pounds per square inch.

References Cited in the file of this patent

UNITED STATES PATENTS

| Number | Name | Date |
|---|---|---|
| 1,779,486 | Melamid | Oct. 28, 1930 |
| 2,068,868 | Pier et al. | Jan. 26, 1937 |
| 2,159,281 | Marecaux | May 23, 1939 |
| 2,360,700 | McAllister et al. | Oct. 17, 1944 |

FOREIGN PATENTS

| Number | Country | Date |
|---|---|---|
| 123,666 | Australia | Mar. 6, 1947 |